United States Patent [19]

Nishimura

[11] Patent Number: 4,763,170

[45] Date of Patent: Aug. 9, 1988

[54] COMPOSITE COPYING APPARATUS

[75] Inventor: Norihisa Nishimura, Nara, Japan

[73] Assignee: Sharp Kabushiki Kaisha, Osaka, Japan

[21] Appl. No.: 82,486

[22] Filed: Aug. 7, 1987

[30] Foreign Application Priority Data

Aug. 8, 1986 [JP] Japan ................................ 61-187066

[51] Int. Cl.[4] ............................................ G03B 27/52

[52] U.S. Cl. ........................................ 355/40; 355/23; 355/24

[58] Field of Search .............................. 355/40, 23, 24

[56] References Cited

U.S. PATENT DOCUMENTS 4,322,157 3/1982 Miura et al. .......................... 355/40
4,494,862 1/1985 Tanaka .................................. 355/40

FOREIGN PATENT DOCUMENTS 223339 5/1987 European Pat. Off. .
3247142 7/1983 Fed. Rep. of Germany .
3544633 6/1986 Fed. Rep. of Germany .
3603755 8/1986 Fed. Rep. of Germany .
3608259 9/1986 Fed. Rep. of Germany .

*Primary Examiner*—Monroe H. Hayes
*Attorney, Agent, or Firm*—Birch, Stewart, Kolasch & Birch

[57] ABSTRACT

An improved composite copying apparatus which is so arranged that, with an image area once set being memorized, a trimming mode and a masking mode are exchanged with respect to the same image area in each of the copying processes for two times, while the two copying processes can be continuously effected by a two-surface continuous copying device and a circulation transport device, whereby setting of modes, inputting of data, and setting of original documents and paper sheets may be eliminated at the second copying process for simplification of the composite copying operation.

1 Claim, 4 Drawing Sheets

COMPOSITE COPYING APPARATUS

BACKGROUND OF THE INVENTION

The present invention generally relates to a copying apparatus and more particularly, to a composite copying apparatus which subjects images of two original documents to trimming and masking for copying thereof in combination on a single paper sheet or the like.

In summary, the composite copying apparatus according to the present invention is intended to facilitate the composite copying operation for copying two images on a single paper sheet in combination with trimming and masking, and is generally provided with a two-surface continuous copying means which bisects the image range in an original document scanning direction for effecting an independent copying process continuously two times with respect to the respective ranges, a circulation transport means for leading paper sheets completed for the copying process into the copying process section again through an intermediate storage portion, an area memory means for memorizing the set area within the image range, a continuous transport means for making said circulation transport means effective in the two copying processes of said two-surface continuous copying means, and a continuous composite copying means which makes effective, the respective trimming mode and masking mode independently with respect to the area stored in said area memory means in each of the two copying processes of said two-surface continuous copying means, and thus, the necessity for repeatedly effecting setting of original documents, setting of paper sheets and inputting of data/ and the like during the composite copying operation is eliminated.

In the conventional copying apparatuses provided with many functions, there are some copying apparatuses capable of effecting trimming and masking. Such a copying apparatus is so arranged that, with respect to an area set through operation of keys or the like provided at a control section, only an image at the inner side thereof is copied, with the image at the outer side being erased in the trimming, while, during the masking, only the outer side of the set area is to be copied. By the copying apparatus constructed as described above, it is possible to effect the composite copying operation in which images of two original documents are combined so as to be formed on a single paper sheet.

In the case where the composite copying is to be effected by the conventional copying apparatus as described above, the image area is set through selection of either one of the trimming mode or masking mode, and thus, a first copying process is effected. Thereafter, the original document is exchanged for selecting the remaining one of the trimming mode and masking mode so as to set the image area again, and the paper sheet formed with the image by the first copying process is taken out from a paper discharge portion to be set at a paper feeding section, thereby to effect a second copying process. As described above, in the known composite copying apparatus, setting of the trimming or masking mode and setting of the image area are required at the respective copying processes, with further necessity for replacement of paper sheets, thus resulting in complication of the composite copying operation.

SUMMARY OF THE INVENTION

Accordingly, an essential object of the present invention is to provide an improved composite copying apparatus which is so arranged that, with an image area once set being memorized, a trimming mode and a masking mode are exchanged with respect to the same image area in each of the copying processes for two times, while the two copying processes can be continuously effected by a two-surface continuous copying means and a circulation transport means, whereby setting of modes, inputting of data, and setting of original documents and paper sheets may be eliminated at the second copying process for simplification of the composited copying operation.

Another important object of the present invention is to provide a composite copying apparatus of the above described type which is simple in construction and stable in functioning with a high reliability.

In accomplishing these and other objects, according to one preferred embodiment of the present invention, with attention directed to the fact that the composite copying operation by the trimming and masking, and the two-surface continuous copying operation are each constituted by copying processes in two times, there is provided a composite copying apparatus including a trimming mode and a masking mode for effecting trimming and masking with respect to any desired area set within an image range of an original document, a two-surface continuous copying means which bisects the image range in an original document scanning direction for effecting an independent copying process continuously two times with respect to the respective ranges, and a circulation transport means for leading paper sheets completed for the copying process into the copying process section again through an intermediate storage portion, and characterized in that there are further provided an area memory means for memorizing the set area within the image range, a continuous transport means for making said circulation transport means effective in the two copying processes of said two-surface continuous copying means, and a continuous composite copying means which makes effective, the respective trimming mode and masking mode independently with respect to the area stored in said area memory means in each of the two copying processes of said two-surface continuous copying means.

By the composite copying apparatus of the present invention as described above, functions as follows are available.

(i) The image area of the original document for effecting the trimming and masking is memorized in the area memory means.

(ii) In the copying processes for two times constituting the two-surface continuous copying means, the circulation transport means is made effective by the continuous transport means, and the copying processes for each of the image regions divided into two parts are continuously effected on a single paper sheet.

(iii) By the continuous composite copying means, the copying processes in two times of the two-surface continuous copying means are constituted by the copying process which has made the trimming mode effective for the area memorized in the area memory means and the copying process which has mode the masking made effective for the same region.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
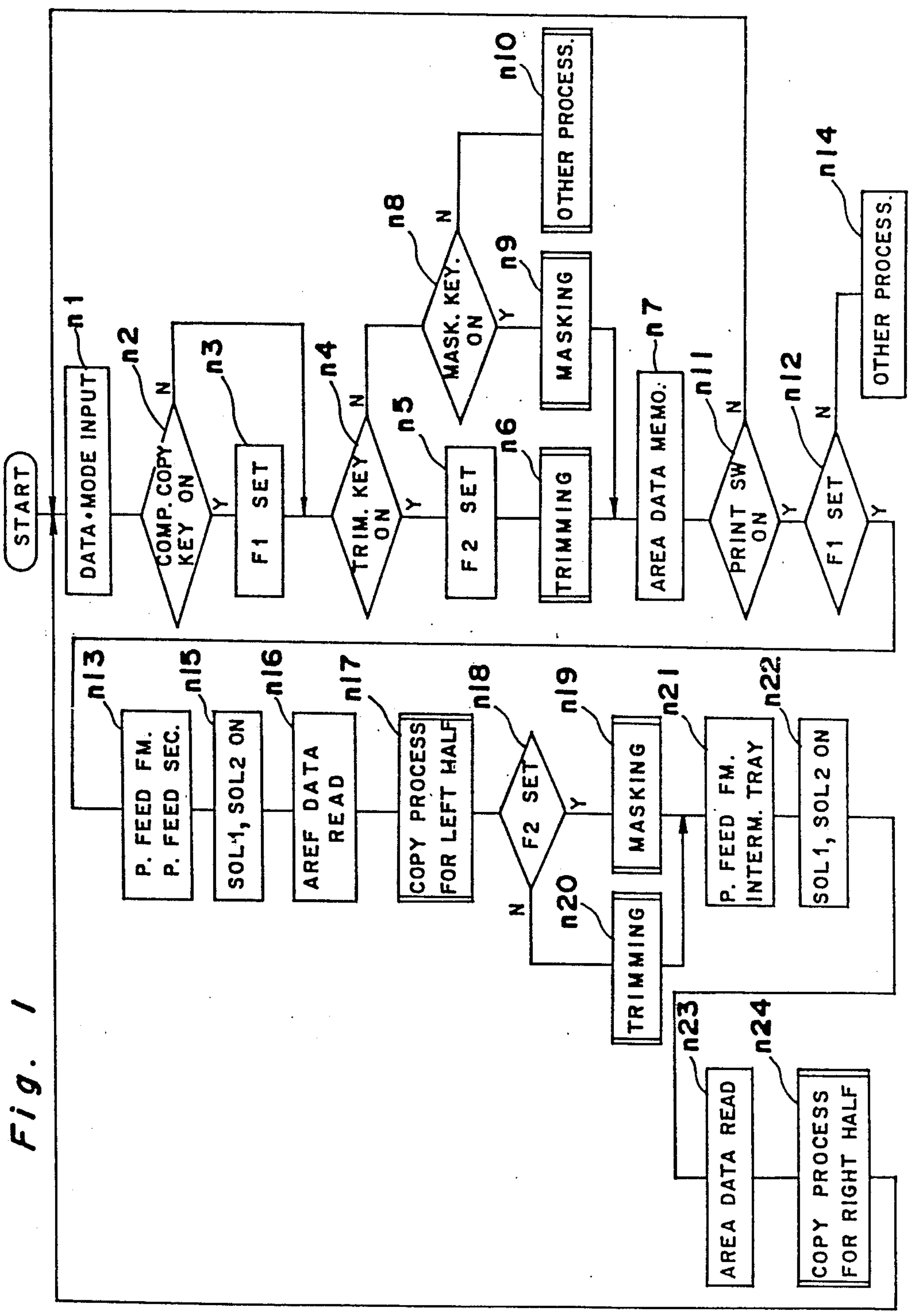
FIG. 1 a flow-chart for explaining the operation of a composite copying apparatus according to the present invention.

Before the description of the present invention proceeds, it is to be noted that like parts are designated by like reference numerals throughout the accompanying drawings.

Figure 2:
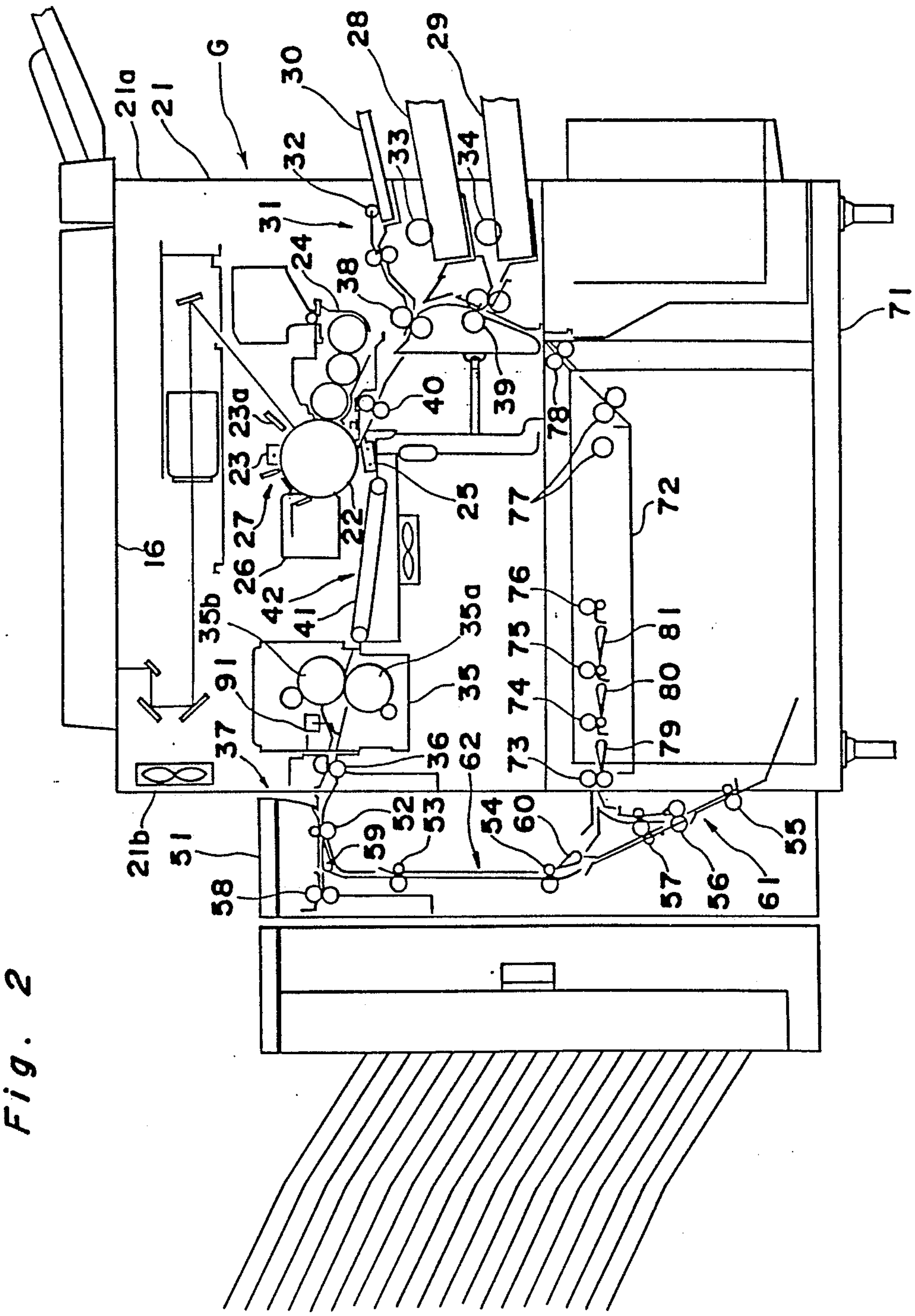
FIG. 2 is a schematic side sectional view of the composite copying apparatus according to one preferred embodiment of the present invention.

Referring now to the drawings, there is shown in FIG. 2 a schematic side sectional view of a composite copying apparatus G according to one preferred embodiment of the present invention.

In FIG. 2, the composite copying apparatus G generally includes an apparatus housing 21, a photosensitive or photoreceptor drum 22 rotatably provided generally at the central portion within the apparatus housing 21, and a corona charger 23, a developing device 24, a transfer/separating charger 25 and a cleaner 26 which are sequentially disposed around the photoreceptor drum 22 so as to constitute a copying process section 27 in a known manner together with said photoreceptor drum 22. At one side wall 21a of the housing 21 (at the right side wall in FIG. 2), there are mounted paper cassettes 28 and 29 and a manual insertion tray 30, thereby to constitute a paper feeding section 31. The paper cassettes 28 and 29 and the tray 30 are respectively provided with paper feeding rollers 33,34 and 32 so as to feed the paper sheet from any one of the cassettes 28 and 29 or the manual insertion tray 30. Within the apparatus housing 21 at the left side of the photoreceptor drum 22 and adjacent to the other side wall 21b of the housing 21, there is provided a fixing device 35 including a pair of rollers 35a and 35b which are heated up to a temperature capable of fusing a developing material by a heater lamp (not shown), so as to fix the image by the developing material through heating and pressurization of the paper sheet therebetween. The paper sheet which has passed through the fixing device 35 is discharged out of the apparatus housing 21 by a set of discharge rollers 36 through a paper discharge portion 37. In the region from the paper feeding section 31 to the paper discharge portion 37 through the copying process section 27, there are disposed transport roller pairs 38, 39 and 40 and a transport belt 41 so as to constitute a main transport passage 42 thereby.

On the other side wall 21b of the apparatus housing 21, there is mounted a both-surface or duplex transport section 51, within which sets of sub-transport rollers 52, 53 and 54, sets of switch back rollers 55, 56 and 57 and a pair of discharge rollers 58 are provided. The switch back rollers 55, 56 and 57 are rotatably provided for rotation both in forward and reverse directions, thereby to constitute a switch back passage 61. Meanwhile, between the set of sub-transport rollers 52 and the pair of discharge rollers 58, a flapper 59 is pivotally provided, and between the set of the sub-transport rollers 54 and the switch back roller 57 another flapper 60 is pivotally provided. The flapper 59 is adapted to lead the paper sheet discharged from the paper discharge portion 37 either into the discharge rollers 58 or into a sub-transport passage 62, while the flapper 60 is arranged to guide the paper sheet which has passed through the sub-transport passage 62 either into the switch back transport passage 61 or into a cabinet 71 disposed at the lower portion of the apparatus housing 21.

Within the cabinet 71, there is provided an intermediate tray 72 which serves as an intermediate storing portion. The intermediate tray 72 is provided with sets of paper in-take roller 73, 74, 75 and 76, paper feeding rollers 77 and 78, and flappers 79, 80 and 81 disposed in spaces between the roller sets 73 and 74, 74 and 75, and 75 and 76 respectively. Of the flappers 79 to 81 adapted to be pivotable, those corresponding to the size of the paper sheets are pivoted upwardly from the state shown in FIG. 2. By the paper in-take rollers 73 to 76, the intermediate tray 72 and the paper feeding rollers 77 and 78, the sub-transport passage 62 is extended up to the paper feeding portion 31 so as to connect the paper discharge portion 37 with the paper feeding section 31.

As described above, within the apparatus housing 21, the main transport passage 42 is formed, while in the both-surface or duplex transport section 51 and the cabinet 71, the sub-transport passage 62 is provided.

During the normal one side copying operation, the paper sheet fed from the paper feeding section 31 passes through the main transport passage 42, and is discharged outside through the paper discharge portion 37 via the discharge rollers 58.

In the both-side or duplex copying in which images are formed on both sides of the copy paper sheet, the paper sheet fed from the paper feeding section 31 once passes through the copying process section 27, and thereafter, is directed into the sub-transport passage 62 and the switch-back transport passage 61 from the paper discharge portion 37, and after being inverted in its transport direction by the switch-back transport passage 61, led into the intermediate tray 70. Upon setting of an original document for the reverse face, the paper sheet within the intermediate tray 72 is led between the paper feeding portion 31 and the copying process portion 27 by the paper feeding rollers 77 and 78, and is again transported into the copying process section 27 by the transport rollers 38 and 40. When the paper sheet has passed through the copying process section 27 two times, the flapper 59 opens in the direction of the discharge rollers 58 so as to discharge the paper sheet outside.

Meanwhile, during the composite copying operation in which images of a plurality of original documents are to be formed on the same side of a paper sheet, the paper sheet which has passed through the copying process section 27 is directly led into the intermediate tray 72 from the sub-transport passage 62. The paper sheet stored in the tray 72 after exchanging of the original document is led between the paper feeding section 31 and the copying process section 27 by the paper feeding rollers 77 and 78, and transported to the copying process section 27 by the transport rollers 38 and 40. Thus, the paper sheet which has passed through the copying process section 27 for a plurality of times is discharged outside from the paper discharge section 37 through the discharge rollers 58. The flappers 59 and 60, intermediate tray 72, and paper feed rollers 77 and 78 as described above constitute the circulation transport means according to the present invention.

Figure 3:
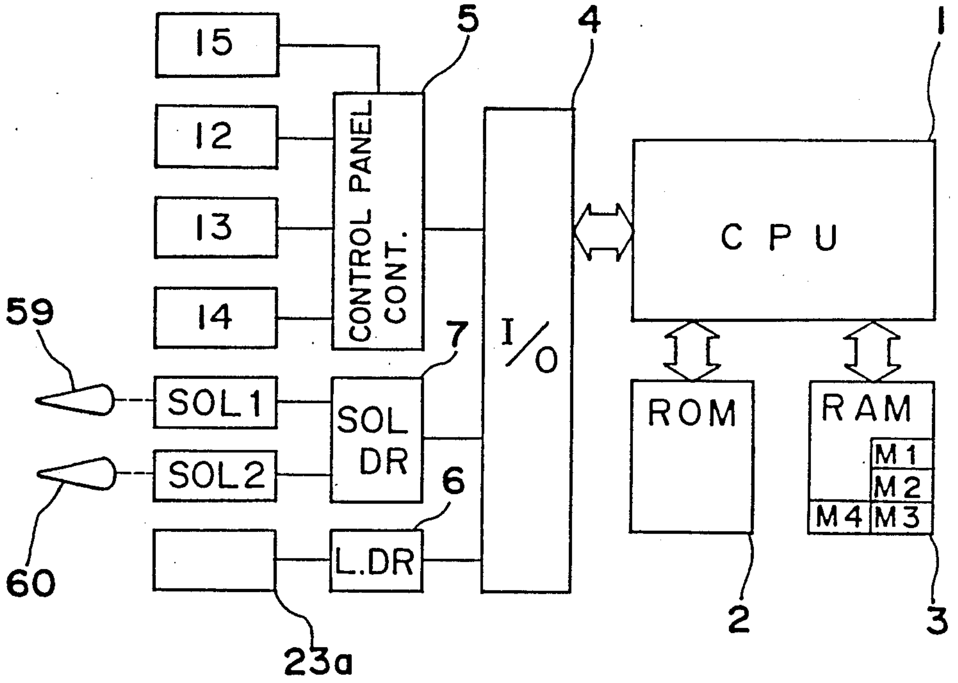
FIG. 3 is a block diagram for a control portion of the composite copying apparatus of FIG. 2.

Referring also to FIG. 3, there is shown a block diagram of a control section of the composite copying apparatus as described so far.

In FIG. 3, the control section includes a CPU (central processing unit) 1 coupled to a ROM 2 and a RAM 3, and also connected, through an I/O interface 4, to a control panel control section 5 having a composite copy key 12, a trimming key 13, a masking key 14 and ten keys 15, a blank lamp driver 6 connected to a blank lamp 23*a*, and a solenoid driver 7 for driving solenoids 1 and 2 connected to the flappers 59 and 60.

To the CPU 1, ON data of the composite copy key 12, trimming key 13, and making key 14 are applied from the control panel control section 5 through the I/O interface 4. The composite copy key 12 is operated when images of two original documents are to be copied onto a single paper sheet. The trimming key 13 instructs to illuminate the blank lamp 23*a* so as not to copy the image at the outer periphery of a preset area, while the masking key 13 instructs to turn on the blank lamp 23*a* so that the image within the set area is not copied. The area as referred to above is set through operation of the ten keys 15

The area thus set by the operation of the ten keys 15 is memorized in a memory area M4 of the RAM 3. In the ROM 2 connected to the CPU 1, programs for defining functionings of the respective devices of the composite copying apparatus are stored, and based on such programs, the CPU 1 outputs control data to the solenoid driver 7 and the blank lamp driver 6, etc. through the I/O interface 4. According to these control data, the solenoid driver 7 controls the solenoids SOL 1 and SOL 2 for pivotal movement of the flappers 59 and 60. The blank lamp driver 6 illuminates the blank lamp 23*a* according to which of the trimming or masking is selected, and also, according to the time and range corresponding to the set area. The memory area M4 referred to above constitutes the area memory means according to the present invention.

Figure 4A:
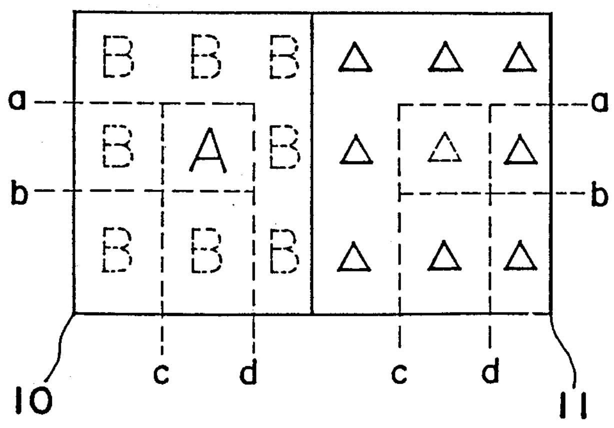
FIGS. 4(A) and 4(B) are top plan views respectively showing images of the original documents and images formed on a paper sheet as related to the composite copying operation through employment of the composite copying apparatus of FIG. 2.

Referring further to FIG. 1, there is shown a flowchart for the composite copying apparatus of FIG. 2 representing the composite copying operation thereof as illustrated in FIG. 4(A).

In FIG. 1, upon completion of initialization and warming-up after the power supply for the copying apparatus has been turned on, input of data and mode is effected (Step n1). Thereafter, it is checked whether or not the composite copy key 12 is operated, and in the case where the composite copy key 12 has been turned on, a flag F1 is set (Steps n2 and n3). This flag F1 is allocated to a memory area M1 of the RAM 3, and memorizes the state as to whether or not the mode is of the composite copying mode. Moreover, the state of operation of the trimming key 13 and masking key 14 is checked, and when the trimming key 13 is on, a flag F2 is set for the trimming processing (Steps n4 to n6), while in the case where the masking key 14 is operated, the masking processing is effected (Steps n4, n8 and n9). The flag F2 is allocated to a memory area M2 of the RAM 3, and memorizes the on state of the trimming key 13. In the case where neither of the trimming key 13 nor the masking key 14 is operated, other processings are to be effected(step n10). Furthermore, area data for designating the image area related to the composite copying is stored in the memory area M4 (Step n7) so as to wait for the operation of a print switch (Step n11).

When the print switch is actuated, the content of the flag F1 is checked (Step n12) for judgement as to whether or not the composite copying has been selected. In the case where the flag F1 is set, the paper sheet is fed from the paper feeding section 31, and the solenoids SOL 1 and SOL 2 are turned on (Steps n13 and n15), whereby the flappers 59 and 60 are respectively opened in the directions of the sub-transport passage 62 and the intermediate tray 72.

Thereafter, the area data memorized in the memory area M4 is read out, and copying process is effected with respect to the original document 10 placed on the left half portion, of the original documents 10 and 11 shown in FIG. 4(A) (Steps n16 and n18).

Figure 5:
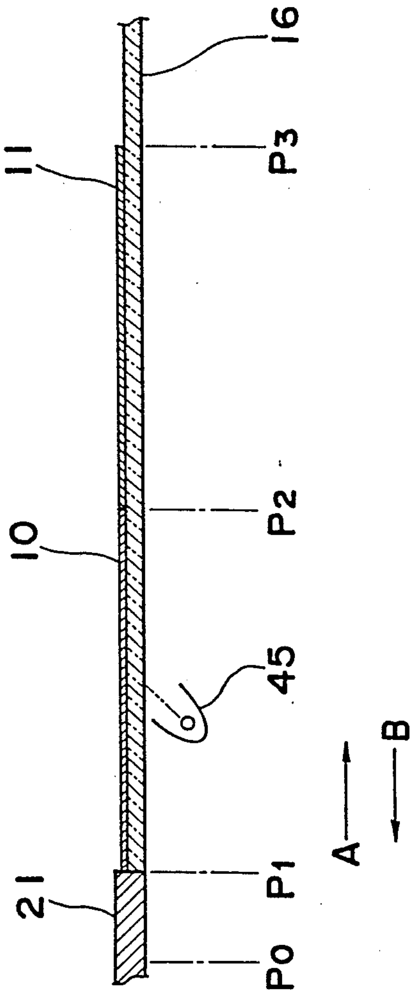
FIG. 5 is a fragmentary cross section in the vicinity of an original document platform of the composite copying apparatus of FIG. 2 for explaining functioning of an optical system employed therein.

As illustrated in FIG. 5 showing a fragmentary cross section on an enlarged scale, in the vicinity of an original document platform 16 of the composite copying apparatus G for explaining functioning of an optical system thereof, in the copying process as described above, the optical system having a light source 45 returns in a direction indicated by the arrow B after advancing from an over-run position $P_0$ up to an intermediate position $P_2$ in a direction of the arrow A. During the above movement, the light source 45 scans the image of the original document in the range between a reference position $P_1$ and the intermediate position $P_2$, which range coincides with the range of the original document 10 at the left side. In this case, if the trimming key 13 has been operated, light of the blank lamp 23*a* is directed onto the surface of the photoreceptor drum 22 corresponding to the portion other than the range for the set region a∼d, and thus, only the range for the region a∼d of the original document 10 is copied on the paper sheet. It is to be noted here that, after operation of the print switch, if the flag Fl is in the reset state, other processes are to be effected (Step n14).

When the paper sheet once completed for the copying process is stored in the intermediate tray 72, the content of the flag F2 is checked (Step n18). In this case, if the flag F2 is in the set state, the masking processing is effected (Step n19), while on the contrary, if the flag F2 is in the reset state, the trimming processing is effected (Step n20). Further, the paper sheet is supplied from the intermediate tray 72 (Step n21), and the solenoids SOL1 and SOL2 are turned on (Step n22), whereby the flapper 59 is opened in the direction of the discharge rollers 58.

Subsequently, area data is read out from the memory area M4, and the copying process is effected only with respect to the right half of the original document placed on the original document platform 16 (Steps n23 and n24). in the above copying process, as shown in FIG. 5, the light source 45 is displaced for advancing and returning between the over-run position $P_0$ and the original document trailing edge position $P_3$ in the directions of the arrows A and B. During the above period, the light source 45 scans the image of the original document in the range only between the intermediate position $P_2$ and the original document trailing edge position P3. This range coincides with the range of the original document 11 at the right side. Since the flag F2 is in the set state in the case where the trimming key 13 is operated during input of the data and mode, the masking processing is effected with respect to the original document 11 at the right side. Accordingly, light of the blank lamp *23a* is projected onto the surface of the photoreceptor drum 22 corresponding to the set area, and the portion of the image of the original document 11 other than the region a∼d, is copied on the paper sheet. It is to be noted here that the region c, d in the direction of scanning of the original document may be measured from the intermediate position $P_2$.

In the flow-chart shown in FIG. 1, Steps n15 and n21 are equivalent to the continuous transport means, while Steps n4 to n6, n8, n9, and n18 to n20 are equivalent to the continuous composite copying means according to the present invention.

Figure 4B:
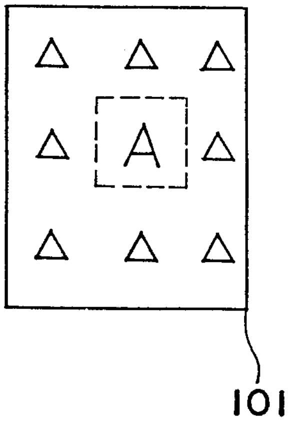

As is seen from the description given so far, according to the present embodiment, in the trimming mode and masking mode, the mode set at the input of data and mode is made effective at the initial copying process, and the remaining other mode is made effective at the second copying process, while the paper sheets completed for the initial copying process are led into the intermediate tray, and during the second copying process, the paper sheets stored in the intermediate tray are directed into the copying process. Furthermore, these two copying processes constitute the two-surface continuous copying means, whereby the image at the left half is scanned at the initial copying process, while the image at the right half is scanned at the second copying process. Accordingly, upon operation of the trimming key 13 during input of the data and mode, the trimming processing is effected with respect to the original document 10 at the left side in the original documents 10 and 11 placed as shown in FIG. 4(A), while the masking processing is given to the original document 11 at the right side. Since these trimming processing and masking processing are effected with respect to the same designated area, the paper sheet 101 is formed with the image as shown in FIG. 4(B).

As is clear from the foregoing description, according to the present invention, in the two-surface continuous copying means so arranged that the image range of the original document placed on the original document platform is bisected in the direction of scanning of the original document so as to continuously effect independent copying processes with respect to the respective bisected portions, it is possible to make effective, the respective trimming mode and masking mode with respect to the same area in the respective copying processes, and also, to make the circulation transport means effective during the two copying processes. Therefore, when the two original documents related to the composite copying operation are placed side by side on the original document platform in the direction of scanning of the original documents, copying processes for the respective original documents are continuously effected, and the composite copying is completed by these two copying processes. In the above case, each of the input of data and mode, setting of the area related to the composite copying operation, and operation of the print switch, may be effected only one time, and moreover, exchange work for the original documents and paper sheets is not particularly required, and thus, the composite copying operation can be markedly facilitated.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A composite copying apparatus comprising:

a trimming mode and a masking mode for effecting trimming and masking with respect to any desired area set within an image range of an original document;

a two-surface continuous copying means, which bisects the image range in an original document scanning direction, for effecting an independent copying process continuously two times with respect to the respective ranges;

circulation transport means for leading paper sheets completed for the copying process into the copying process section again through an intermediate storage portion;

area memory means for memorizing the set area within the image range;

continuous transport means for making said circulation transport means effective in the two copying processes of said two-surface continuous copying means; and continuous composite copying means for initiating the respective trimming mode and masking mode independently with respect to the area stored in said area memory means in each of the two copying processes of said two-surface continuous copying means.

* * * * *

UNITED STATES PATENT AND TRADEMARK OFFICE
CERTIFICATE OF CORRECTION

PATENT NO. : 4,763,170

DATED : August 9, 1988

INVENTOR(S) : Norihisa NISHIMURA

It is certified that error appears in the above-identified patent and that said Letters Patent is hereby corrected as shown below:

In Figure 1, box n16 please change "AREF" to --AREA--

Signed and Sealed this

Sixth Day of December, 1988

*Attest:*

DONALD J. QUIGG

*Attesting Officer*

*Commissioner of Patents and Trademarks*